(12) United States Patent
Wu et al.

(10) Patent No.: US 12,493,173 B2
(45) Date of Patent: Dec. 9, 2025

(54) FIXED-FOCUS PROJECTION LENS MODULE

(71) Applicant: Coretronic Corporation, Hsin-Chu (TW)

(72) Inventors: Wei-Ting Wu, Hsin-Chu (TW); Cheng-Huan Lyu, Hsin-Chu (TW); Ching-Chuan Wei, Hsin-Chu (TW); Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 446 days.

(21) Appl. No.: 17/978,953

(22) Filed: Nov. 1, 2022

(65) Prior Publication Data
US 2023/0176342 A1    Jun. 8, 2023

(30) Foreign Application Priority Data

Dec. 2, 2021 (CN) .......................... 202111457913.2

(51) Int. Cl.
| | | |
|---|---|---|
| *G02B 13/16* | (2006.01) | |
| *G02B 9/64* | (2006.01) | |
| *G02B 13/00* | (2006.01) | |
| *G02B 13/22* | (2006.01) | |

(52) U.S. Cl.
CPC ............... *G02B 13/16* (2013.01); *G02B 9/64* (2013.01); *G02B 13/0045* (2013.01); *G02B 13/22* (2013.01)

(58) Field of Classification Search
CPC ....... G02B 13/16; G02B 9/64; G02B 13/0045
See application file for complete search history.

(56) References Cited

U.S. PATENT DOCUMENTS

| | | | |
|---|---|---|---|
| 7,859,763 B2 | 12/2010 | Lu et al. | |
| 8,891,181 B2 | 11/2014 | Lee | |
| 2010/0231873 A1* | 9/2010 | Chen ................ | G02B 17/0852 |
| | | | 359/664 |

(Continued)

FOREIGN PATENT DOCUMENTS

| | | |
|---|---|---|
| CN | 101893750 | 11/2010 |
| CN | 102043229 | 5/2011 |

(Continued)

OTHER PUBLICATIONS

"Office Action of Korea Counterpart Application", issued on Nov. 13, 2024, p. 1-p. 7.

(Continued)

*Primary Examiner* — Lucy P Chien
(74) *Attorney, Agent, or Firm* — JCIPRNET

(57) ABSTRACT

A fixed-focus projection lens module used for projecting an image beam provided by a light valve onto a screen is provided. The fixed-focus projection lens module includes a first lens, a second lens, a third lens, a fourth lens, a fifth lens, a sixth lens, a seventh lens and a light-transmitting element arranged in sequence from a screen side to a display side along an optical axis. The fixed-focus projection lens module satisfies: 1<|OAL/BFL|<2.1, and OAL is a distance from the screen side surface of the first lens to the display side surface of the seventh lens on the optical axis, BFL is a distance from the screen side surface of the light-transmitting element to a display surface of the light valve on the optical axis.

17 Claims, 10 Drawing Sheets

(56) References Cited

U.S. PATENT DOCUMENTS

2016/0202452 A1  7/2016  Kuo et al.
2021/0096341 A1  4/2021  Wu et al.
2021/0199932 A1  7/2021  Chang et al.

FOREIGN PATENT DOCUMENTS

| | | |
|---|---|---|
| CN | 113189739 | 7/2021 |
| JP | 2002341242 | 11/2002 |
| JP | 2004354829 | 12/2004 |
| KR | 101483978 | 1/2015 |
| TW | I651564 | 2/2019 |
| TW | I695993 | 6/2020 |

OTHER PUBLICATIONS

"Office Action of China Counterpart Application", issued on Apr. 25, 2025, p. 1-p. 6.

* cited by examiner

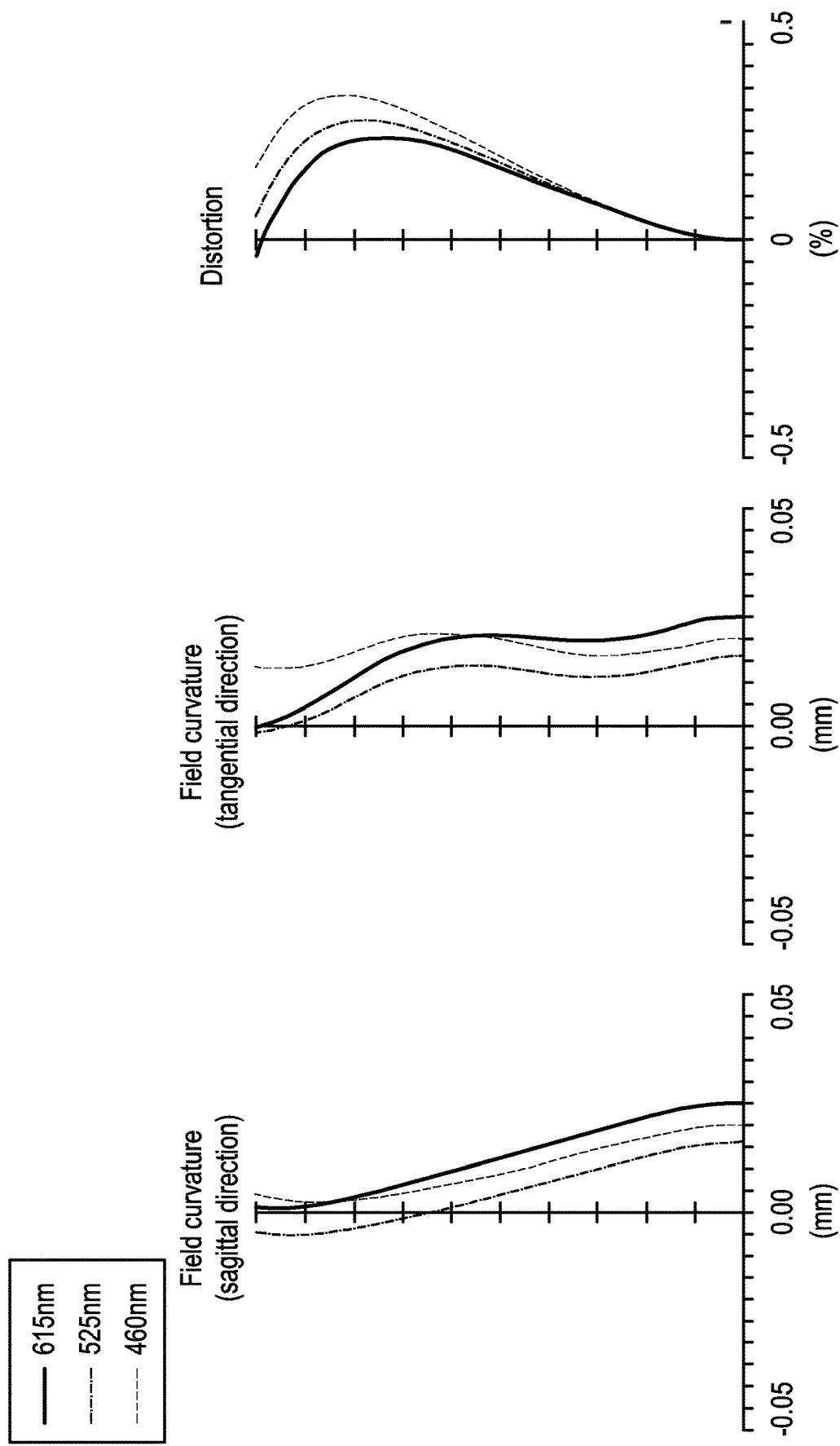

FIXED-FOCUS PROJECTION LENS MODULE

CROSS-REFERENCE TO RELATED APPLICATION

This application claims the priority benefit of China application serial no. 202111457913.2 filed on Dec. 2, 2021. The entirety of the above-mentioned patent application is hereby incorporated by reference herein and made a part of this specification.

BACKGROUND

Technical Field

The disclosure relates to an optical lens, and particularly relates to a fixed-focus projection lens module.

Description of Related Art

Along with development of modern technology, an increasing number of projection devices (projectors) are designed to be light, thin, short and small, such as portable pocket projectors. In terms of a lens design of the projection device, in order to meet the requirements on lightness, thinness, shortness and smallness of the projection device, the lens must be light, thin, short and small and have high resolution. However, most of zoom lenses in the market currently have two or more lens groups, and when performing focusing, a distance between multiple lens groups needs to be adjusted, which results in a fact that a mechanism of the zoom lens becoming larger and complicated, manufacturing cost thereof is relatively high, and there are certain difficulties in assembling. Moreover, a design of a glass lens adopted in the current market also results in a heavy weight of the lens.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a fixed-focus projection lens module, which meets the demand for light, thin, short and small design, and meanwhile meets the demand for high projection resolution.

Other objects and advantages of the disclosure may be further illustrated by the technical features broadly embodied and described as follows.

In order to achieve one or a portion of or all of the objects or other objects, an embodiment of the disclosure provides a fixed-focus projection lens module used for projecting an image beam provided by a light valve onto a screen. The fixed-focus projection lens module includes a first lens, a second lens, a third lens, a fourth lens, a fifth lens, a sixth lens, a seventh lens and a light-transmitting element arranged in sequence from a screen side to a display side along an optical axis. Each of the first lens, the second lens, the third lens, the fourth lens, the fifth lens, the sixth lens, the seventh lens and the light-transmitting element has a screen side surface facing the screen side and allowing the image beam to pass through, and a display side surface facing the display side and allowing the image beam to pass through. The first lens, the second lens, the third lens, the fourth lens, and the seventh lens respectively have negative, positive, negative, positive, and positive refractive powers. The fixed-focus projection lens module satisfies: $1<|OAL/BFL|<2.1$, and OAL is a distance from the screen side surface of the first lens to the display side surface of the seventh lens on the optical axis, BFL is a distance from the screen side surface of the light-transmitting element to a display surface of the light valve on the optical axis, and the light-transmitting element is a first optical element with no refractive power located behind the seventh lens along the optical axis from the screen side to the display side.

In an embodiment of the disclosure, the light-transmitting element is a flat glass actuator or a prism.

In an embodiment of the disclosure, the fifth lens and sixth lens respectively have negative and positive refractive powers.

In an embodiment of the disclosure, the fifth lens and sixth lens form a first double cemented lens. The first double cemented lens has a positive refractive power, and the fifth lens is a biconcave lens, and the sixth lens is a biconvex lens.

In an embodiment of the disclosure, the first lens is a concave-convex lens with a convex surface facing the screen side. The third lens is a biconcave lens. The fourth lens is a biconvex lens.

In an embodiment of the disclosure, the first lens is a plastic aspheric lens.

In an embodiment of the disclosure, the seventh lens is a glass aspheric lens.

In an embodiment of the disclosure, the fifth lens and the sixth lens respectively have positive and negative refractive powers.

In an embodiment of the disclosure, the second lens and the third lens form a first double cemented lens. The first double cemented lens has a positive refractive power, and the second lens and the third lens are both concave-convex lenses with convex surfaces facing the display side.

In an embodiment of the disclosure, the sixth lens and seventh lens form a second double cemented lens. The second double cemented lens has a positive refractive power, and the sixth lens is a concave-convex lens with a convex surface facing the screen side, and the seventh lens is a biconvex lens.

In an embodiment of the disclosure, the first lens and fifth lens are plastic aspheric lenses.

In an embodiment of the disclosure, when the fixed-focus projection lens module performs focusing, the fixed-focus projection lens module is adapted to change a distance D, and the distance D is a distance from the display side surface of the seventh lens to the screen side surface of the light-transmitting element on the optical axis.

In an embodiment of the disclosure, a F-number of the fixed-focus projection lens module is less than or equal to 1.6.

In an embodiment of the disclosure, the fixed-focus projection lens module further includes a stop. The stop is located between the third lens and the fourth lens on the optical axis.

In an embodiment of the disclosure, the fixed-focus projection lens module is a telecentric projection lens module.

In an embodiment of the disclosure, the fixed-focus projection lens module further includes a prism. The prism is located between the seventh lens and the light valve on the optical axis.

In an embodiment of the disclosure, the fixed-focus projection lens module further includes a cover glass. The cover glass is located between the seventh lens and the light valve on the optical axis.

Based on the above description, in an embodiment of the disclosure, the fixed-focus projection lens module is designed as a single-group structure including the first lens to the seventh lens, and satisfies 1<|OAL/BFL|<2.1. Compared with the conventional fixed-focus lens with a normal projection ratio, the fixed-focus projection lens module of the embodiment of the disclosure is simple in structure and easy to assemble, and a production time thereof is shorter than that of a zoom lens. Moreover, the requirements of thinness, shortness and smallness under the demand of high resolution (93 lp/mm) are met.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 5A to FIG. 5C are diagrams of field curvature and distortion aberrations of the fixed-focus projection lens module of FIG. 2.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated" for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
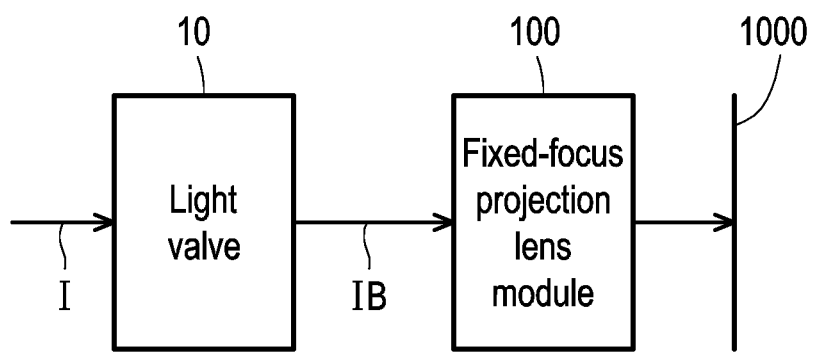
FIG. 1 is a block diagram of a fixed-focus projection lens module for projecting an image beam provided by a light valve onto a screen according to an embodiment of the disclosure.
Figure 2:
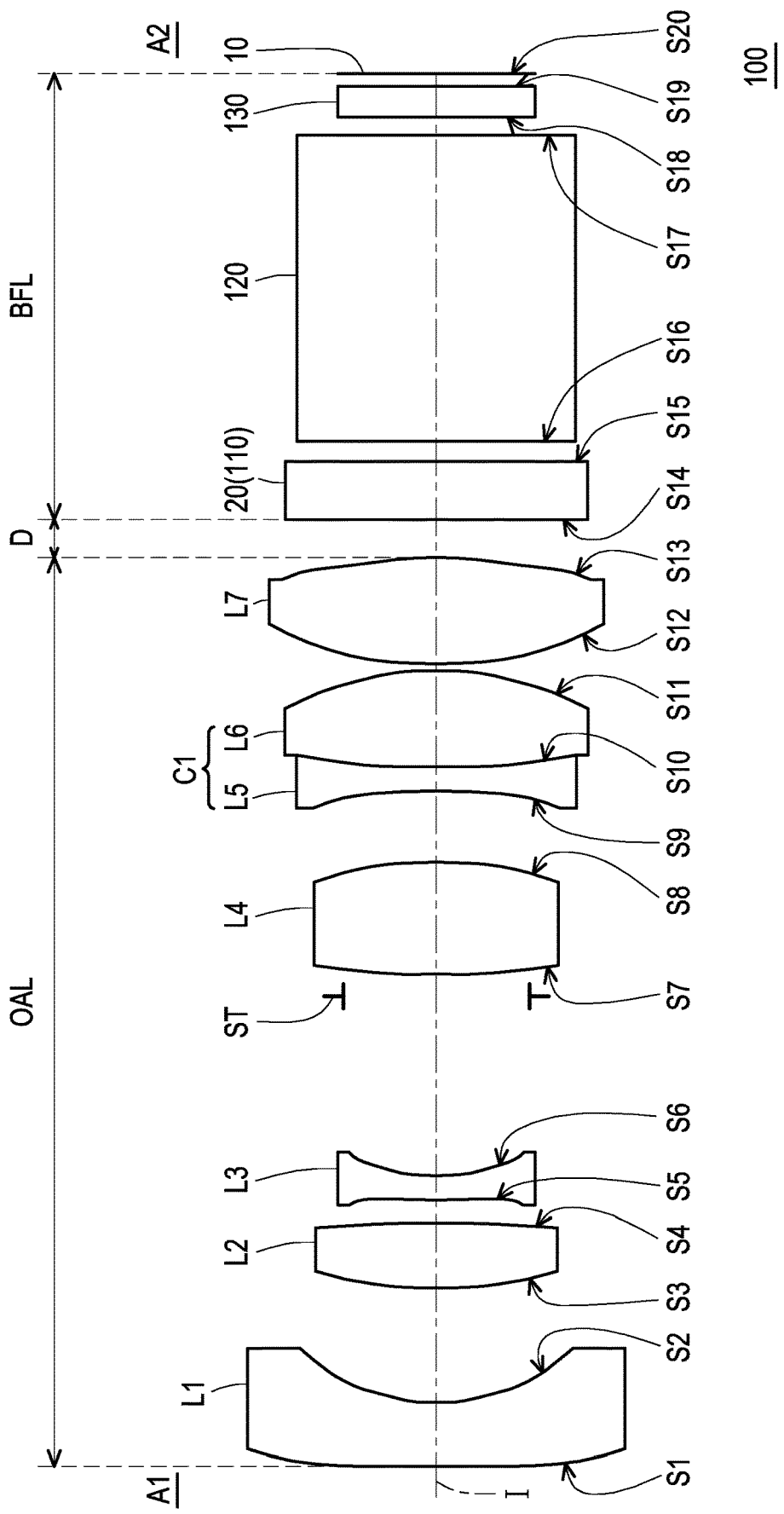
FIG. 2 is a schematic diagram of a fixed-focus projection lens module according to a first embodiment of the disclosure.

FIG. 1 is a block diagram of a fixed-focus projection lens module for projecting an image beam provided by a light valve onto a screen according to an embodiment of the disclosure. FIG. 2 is a schematic diagram of a fixed-focus projection lens module according to a first embodiment of the disclosure. The fixed-focus projection lens module of the embodiment of the present disclosure is, for example, applied to a projection device, but it may also be applied to an image capturing device, which is not limited by the disclosure. Referring to FIG. 1 and FIG. 2 at the same time, a fixed-focus projection lens module 100 of the embodiment is embodied to be applied to a projection device, and the fixed-focus projection lens module 100 is used for projecting an image beam IB provided by a light valve 10 located at a display side A2 onto a screen 1000 located at a screen side A1. The fixed-focus projection lens module 100 includes a first lens L1, a second lens L2, a third lens L3, a fourth lens L4, a fifth lens L5, a sixth lens L6, a seventh lens L7, and a light-transmitting element 20 arranged in sequence from the screen side A1 to the display side A2 along an optical axis I.

In detail, the light valve 10 of the embodiment is, for example, a reflective optical modulator such as a liquid crystal on silicon panel (LCOS panel), a digital micro-mirror device (DMD), etc. In some embodiments, the light valve 10 may also be a transmissive optical modulator such as a transparent liquid crystal panel, an electro-optical modulator, a magneto-optic modulator, or an acousto-optic modulator (AOM), etc. The disclosure does not limit the pattern and type of the light valve 10.

In the embodiment, the first lens L1 to the light-transmitting element 20 respectively have screen side surfaces (which are respectively surfaces S1, S3, S5, S7, S9, S10, S12, S14) facing the screen side A1 and allowing the image beam IB to pass through, and display side surfaces (which are respectively surfaces S2, S4, S6, S8, S10, S11, S13, S15)

facing the display side A2 and allowing the image beam IB to pass through. The first lens L1, the second lens L2, the third lens L3, the fourth lens L4, the fifth lens L5, the sixth lens L6, and the seventh lens L7 form a lens group, and an overall refractive power thereof is positive, and the first lens L1 to the seventh lens L7 respectively have negative, positive, negative, positive, negative, positive, and positive refractive powers.

In the embodiment, the first lens L1 is a concave-convex lens with a convex surface facing the screen side A1, and the first lens L1 is a plastic aspheric lens and has a negative refractive power. The second lens L2 is a biconvex lens, and the second lens L2 is a glass spherical lens and has a positive refractive power. The third lens L3 is a biconcave lens, and the third lens L3 is a glass spherical lens and has a negative refractive power. The fourth lens L4 is a biconvex lens, and the fourth lens L4 is a glass spherical lens and has a positive refractive power. The fifth lens L5 and the sixth lens L6 form a first double cemented lens C1. The first double cemented lens C1 has a positive refractive power, and the fifth lens L5 is a biconcave lens, the sixth lens L6 is a biconvex lens, the fifth lens L5 and the sixth lens L6 are both glass spherical lenses, and the fifth lens L5 has a negative refractive power and the sixth lens L6 has positive refractive power. The seventh lens L7 is a biconvex lens, and the seventh lens L7 is a glass aspheric lens and has a positive refractive power.

The following table 1 to table 2 list data of a preferred embodiment of the fixed-focus projection lens module 100. However, the data listed below are not intended to limit the disclosure. Anyone familiar with this field of technology may make appropriate changes to its parameters or settings after referring to the disclosure, but it should still fall within the scope of the disclosure.

In the embodiment, actual designs of the aforementioned elements may be seen in table 1 below.

TABLE 1

| Element | Surface | Type | Curvature (1/mm) | Distance (mm) | Refractive index (Nd) | Abbe number (Vd) |
|---|---|---|---|---|---|---|
| L1 | S1 | Aspheric surface | −62.99 | 2.31 | 1.53 | 55.95 |
|  | S2 | Aspheric surface | 9.52 | 4.10 |  |  |
| L2 | S3 | Spherical surface | 16.16 | 2.29 | 1.80 | 25.40 |
|  | S4 | Spherical surface | −66.11 | 0.93 |  |  |
| L3 | S5 | Spherical surface | −26.13 | 0.80 | 1.50 | 80.40 |
|  | S6 | Spherical surface | 6.17 | 6.46 |  |  |
| ST |  | Plane | Infinite | 0.82 |  |  |
| L4 | S7 | Spherical surface | 25.30 | 4.06 | 1.50 | 78.90 |
|  | S8 | Spherical surface | −12.87 | 2.57 |  |  |
| L5 | S9 | Spherical surface | −17.35 | 0.80 | 1.75 | 30.21 |
| L6 | S10 | Spherical surface | 27.94 | 3.51 | 1.51 | 77.84 |
|  | S11 | Spherical surface | −11.08 | 0.20 |  |  |
| L7 | S12 | Aspheric surface | 13.27 | 3.86 | 1.54 | 73.35 |
|  | S13 | Aspheric surface | −16.84 | 1.40 |  |  |
| 110 | S14 | Plane | Infinite | 2 | 1.52 | 58.60 |
|  | S15 | Plane | Infinite | 0.8 |  |  |
| 120 | S16 | Plane | Infinite | 11 | 1.74 | 49.34 |

TABLE 1-continued

| Element | Surface | Type | Curvature (1/mm) | Distance (mm) | Refractive index (Nd) | Abbe number (Vd) |
|---|---|---|---|---|---|---|
|  | S17 | Plane | Infinite | 0.7 |  |  |
| 130 | S18 | Plane | Infinite | 1.1 | 1.51 | 62.91 |
|  | S19 | Plane | Infinite | 0.30 |  |  |
| 10 | S20 | Plane | Infinite | 0 |  |  |

In Table 1, the first lens L1 has a surface S1 and a surface S2 from the screen side A1 to the display side A2, and the second lens L2 has a surface S3 and a surface S4 arranged in sequence from the screen side A1 to the display side A2. Deduced by analogy, the surfaces corresponding to each element are not repeated. The fifth lens L5 and the sixth lens L6 are a set of cemented lenses, so that the surface S10 of the fifth lens L5 facing the display side A2 and the surface S10 of the sixth lens L6 facing the screen side A1 are the same surface. In addition, in table 1, "distance" refers to a distance between two adjacent surfaces on the optical axis I. For example, a distance corresponding to the surface S1 refers to the distance between the surface S1 and the surface S2 on the optical axis I, and a distance corresponding to the surface S2 refers to a straight-line distance from the surface S2 to the surface S3 on the optical axis I, and so on.

In the embodiment, the surfaces S1 and S2 of the first lens L1 and the surfaces S12 and S13 of the seventh lens L7 are all aspherical surfaces, and the surfaces of the remaining lenses (the second lens L2 to the sixth lens L6) are all spherical surfaces, and equation (1) of the aspheric surface is as follows:

$$x = \frac{c'y^2}{1+\sqrt{1-(1+K)c'^2y^2}} + A'y^2 + Ay^4 + By^6 + Cy^8 + Dy^{10} + Ey^{12} + Fy^{14} + Gy^{16} \ldots \quad \text{Equation (1)}$$

In the above equation (1), x is a sag in a direction of the optical axis, c' is an inverse of a radius of an osculating sphere, i.e., an inverse of a curvature radius close to the optical axis I, K is a quadric coefficient, and y is an aspheric height, i.e., a height from a center of a lens to an edge of the lens. A-G respectively represent aspheric coefficients of each order of aspheric polynomials. Table 2 lists parameter values of the surfaces S1 and S2 of the first lens L1 and the surfaces S12 and S13 of the seventh lens L7, in which the second-order aspheric coefficients A' are all zero.

TABLE 2

|  | S1 | S2 | S12 | S13 |
|---|---|---|---|---|
| K | −10 | −1.12 | −0.11 | −0.40 |
| A | 1.23E−03 | 1.64E−03 | −2.07E−05 | 1.97E−04 |
| B | −3.95E−05 | −1.81E−05 | −2.34E−07 | 2.46E−07 |
| C | 1.05E−06 | −1.41E−06 | 1.20E−07 | 3.08E−08 |
| D | −1.97E−08 | 1.43E−07 | −8.62E−09 | −4.88E−09 |
| E | 2.37E−10 | −5.51E−09 | 3.40E−10 | 2.77E−10 |
| F | −1.59E−12 | 1.01E−10 | −6.29E−12 | −6.12E−12 |
| G | 4.44E−15 | −7.04E−13 | 4.69E−14 | 5.16E−14 |

In the embodiment, the fixed-focus projection lens module 100 further includes a physical stop ST. As shown in FIG. 2, the stop ST is located between the third lens L3 and the fourth lens L4 on the optical axis I.

In the embodiment, as shown in FIG. 2, the light-transmitting element 20 is a first optical element with no refractive power located behind the seventh lens L7 along the optical axis I from the screen side A1 to the display side A2. The light-transmitting element 20 of the fixed-focus projection lens module 100 may be a flat glass actuator 110. The flat glass actuator 110 oscillates back and forth along a direction perpendicular to the optical axis I at a fixed position to change a transmission path of the image beam IB. Since the transmission path of the image beam IB is changed by the flat glass actuator 110, a user may view superimposition of images of the image beam IB at different positions on the screen 1000 within a time, and an effect of improving a resolution of a projection image projected on the screen 1000 is achieved.

In the embodiment, the fixed-focus projection lens module 100 further includes a prism 120 and a cover glass 130 arranged in sequence along the optical axis I from the screen side A1 to the display side A2. The prism 120 and the cover glass 130 are located between the seventh lens L7 and the light valve 10 on the optical axis I, and located between the light-transmitting element 20 and the light valve 10.

In the embodiment, the fixed-focus projection lens module 100 is a telecentric projection lens module, and an aperture of the fixed-focus projection lens module 100 is less than or equal to 1.6.

In the embodiment, the fixed-focus projection lens module 100 satisfies: 1<|OAL/BFL|<2.1, OAL is a distance from the screen side surface of the first lens L1 to the display side surface of the seventh lens L7 on the optical axis I, i.e., a distance from the surface S1 of the first lens L1 facing the screen side A1 to the surface S13 of the seventh lens L7 facing the display side A2 on the optical axis I. BFL is a distance from a screen side surface of the light-transmitting element 20 to a display surface S20 of the light valve 10 on the optical axis I, i.e., a distance from the surface S14 of the light-transmitting element 20 facing the screen side A1 to the display surface S20 of the light valve 10 on the optical axis I. In addition, the fixed-focus projection lens module 100 may focus by changing the distance D. The distance D of the fixed-focus projection lens module 100 is a distance from the surface S13 of the seventh lens L7 facing the display side A2 to the surface S14 of the light-transmitting element 20 facing the screen side A1 on the optical axis I. Namely, the distance D between the surface S13 and the surface S14 is variable. Moreover, through the above design, when the distance between the screen side A1 and the display side A2 changes, the fixed-focus projection lens module 100 of the embodiment may effectively control a size and definition of the projection image by changing the distance D.

Figure 3:
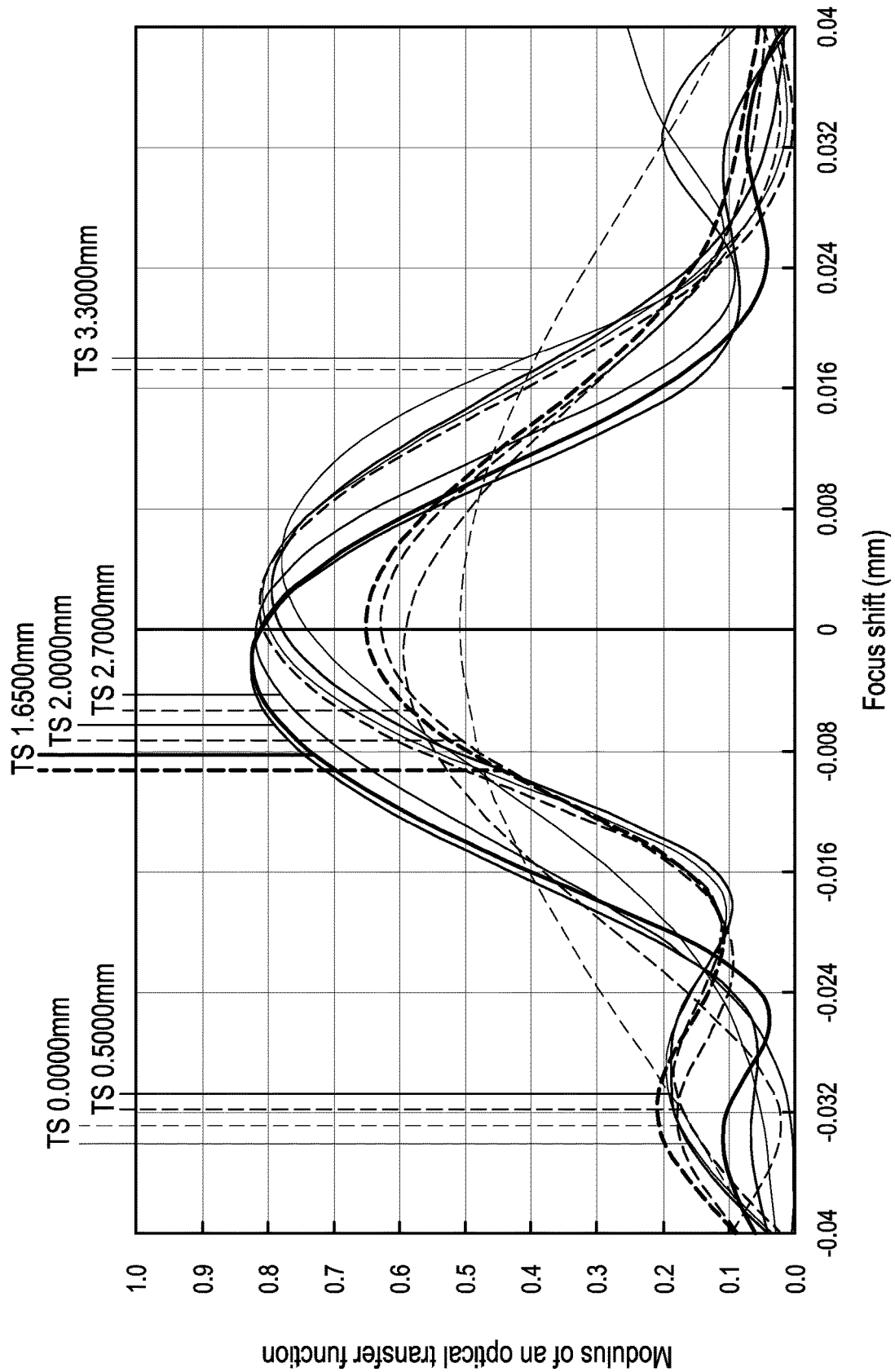
FIG. 3 is a modulation transfer function (MTF) diagram of the fixed-focus projection lens module of FIG. 2.

FIG. 3 is a modulation transfer function diagram of the fixed-focus projection lens module of FIG. 2. Referring to FIG. 3, in FIG. 3, a spatial frequency is 93.0000 cycles/mm, and FIG. 3 is a modulation transfer function (MTF) diagram of the fixed-focus projection lens module 100 at different image heights, and a horizontal axis is a focus shift, a vertical axis is modulus of the optical transfer function, T represents a curve in a tangential direction, S represents a curve in a sagittal direction, and a value marked next to "TS" represents an image height. It may be verified from FIG. 3 that the optical transfer function curve shown by the fixed-focus projection lens module 100 of the embodiment is within a standard range, so that it has good optical imaging quality.

Figure 4:
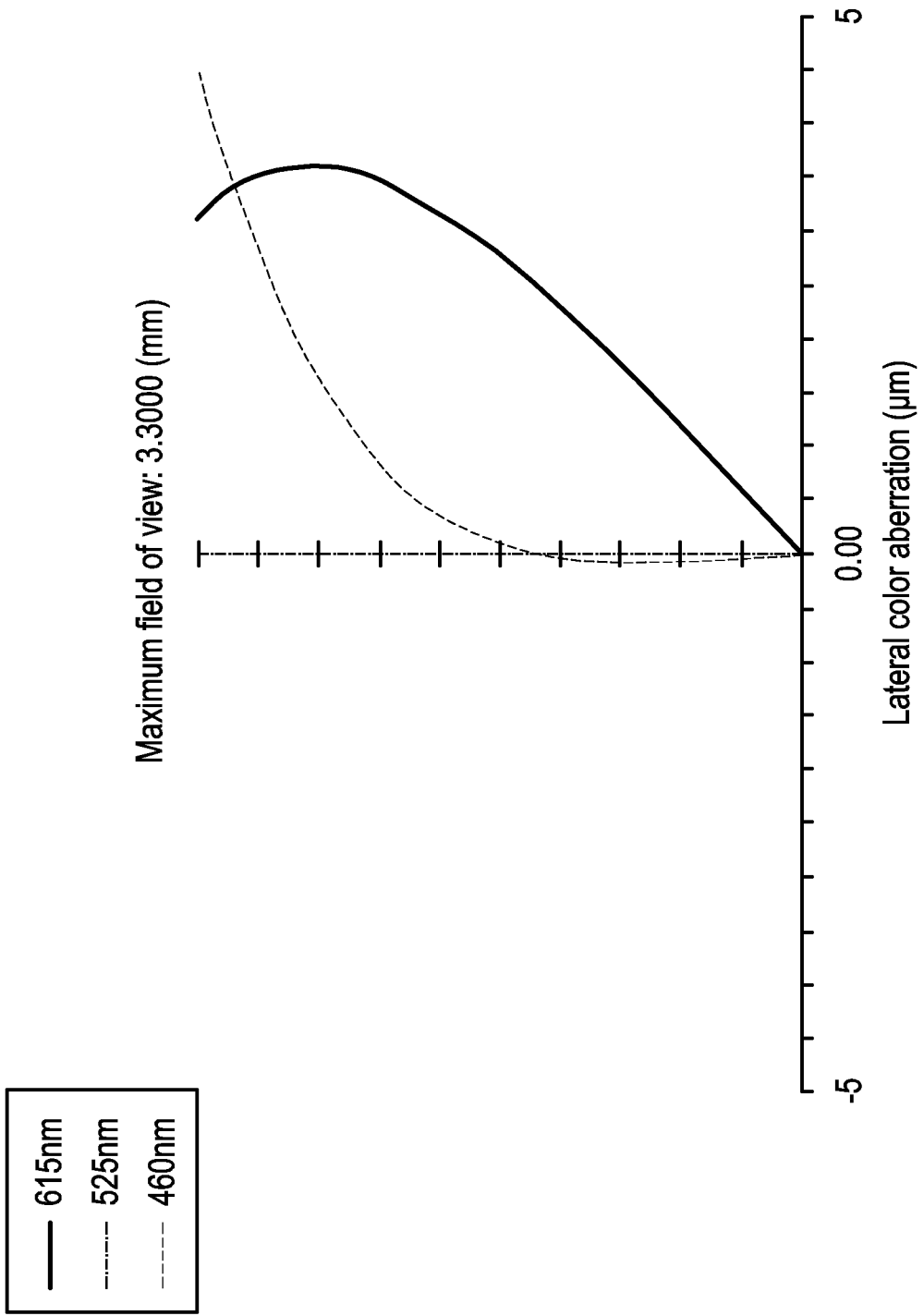
FIG. 4 is a lateral color aberration diagram of the fixed-focus projection lens module of FIG. 2.
Figure 6A:
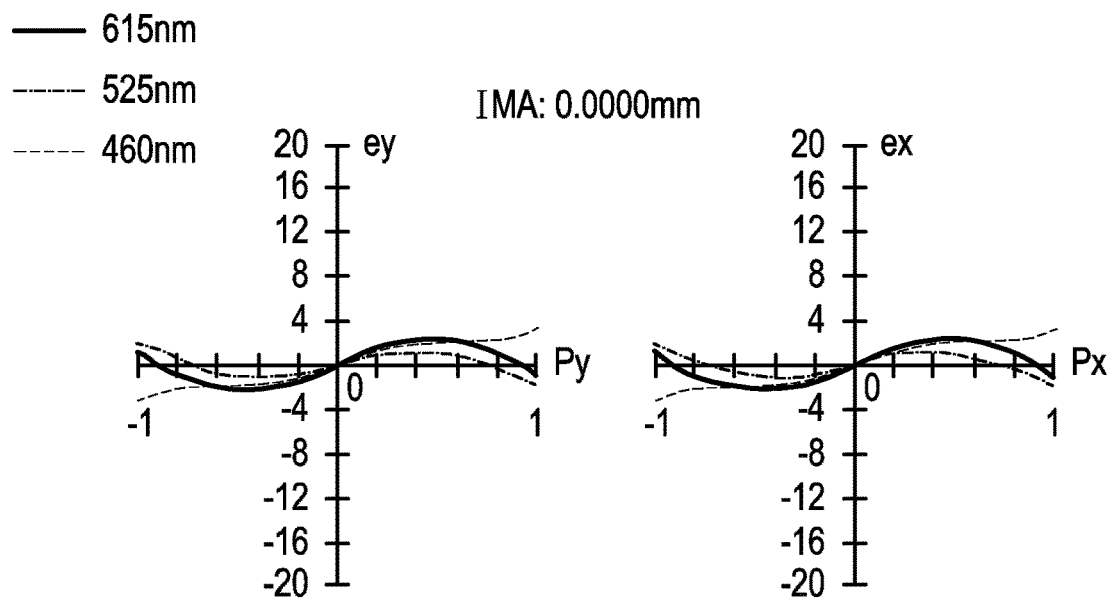
FIG. 6A to FIG. 6F are respectively transverse ray fan plots of the fixed-focus projection lens module of FIG. 2 at different image heights.
Figure 6B:
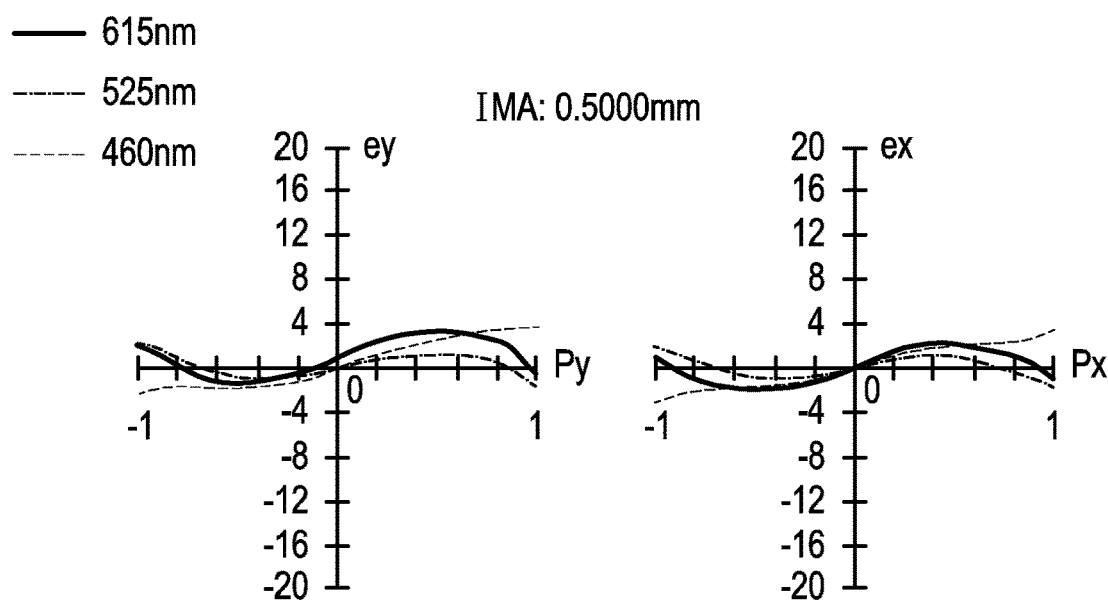
Figure 6C:
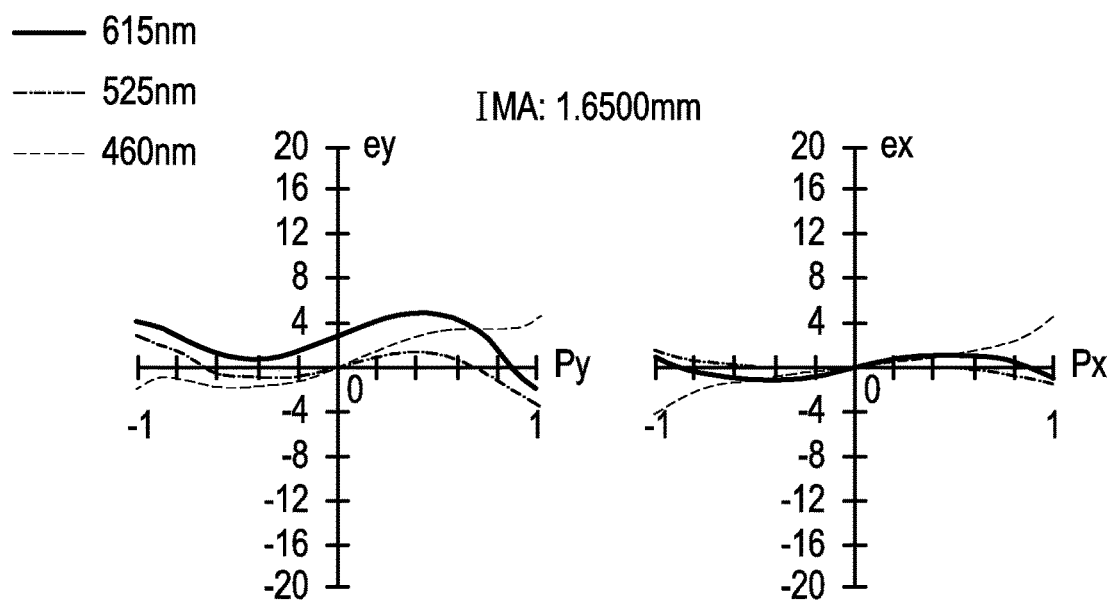
Figure 6D:
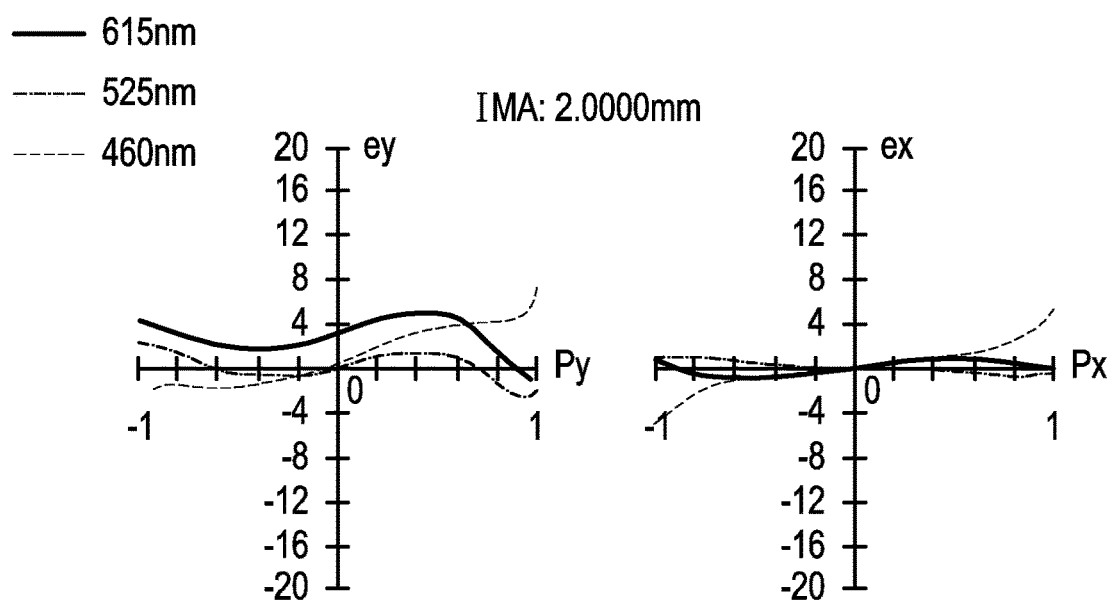
Figure 6E:
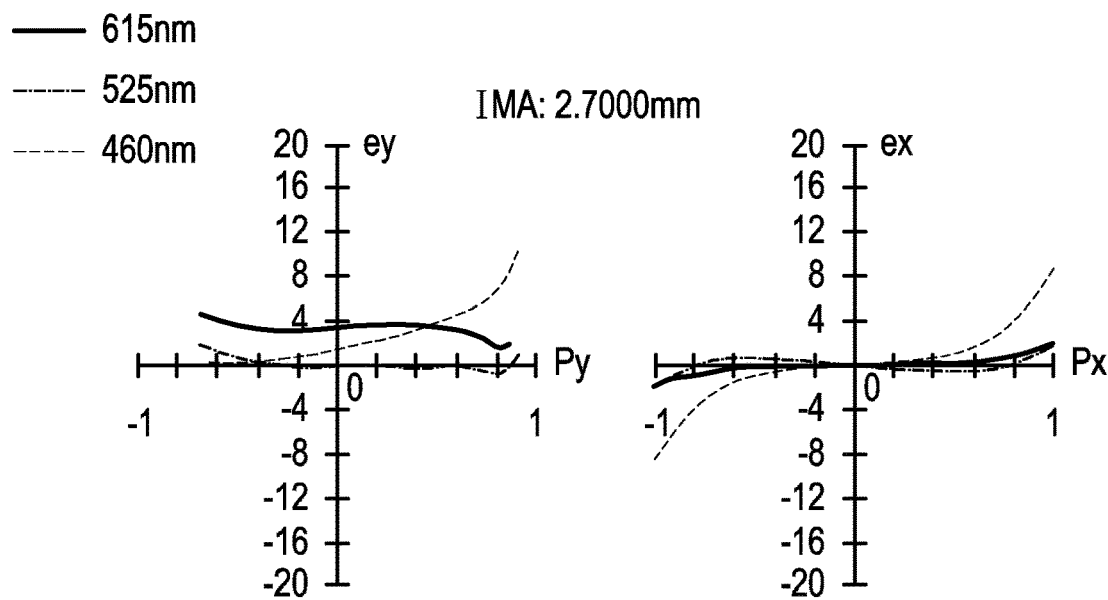
Figure 6F:
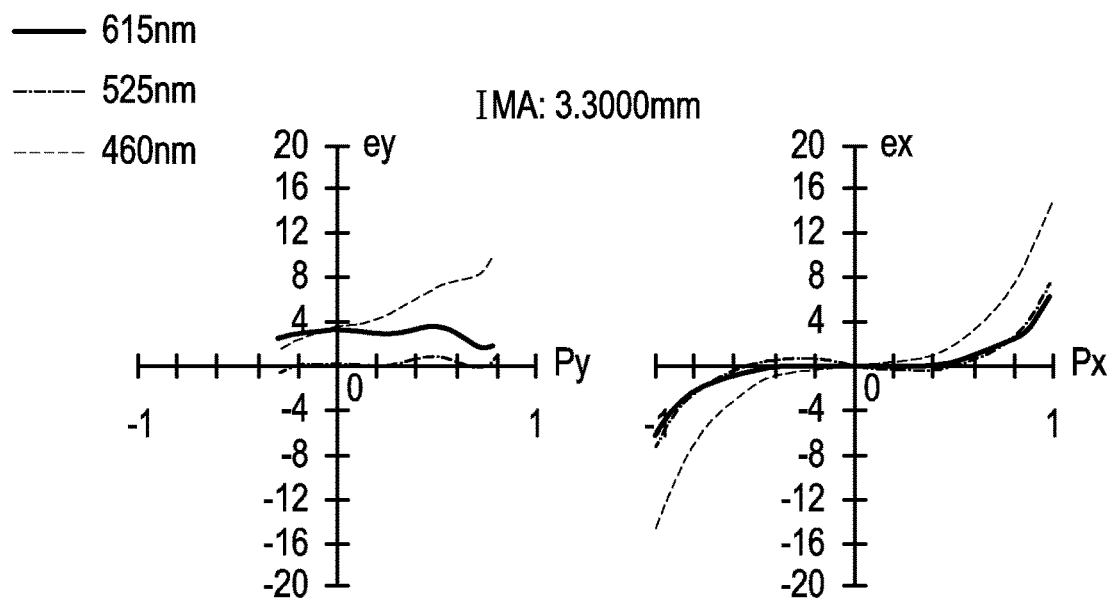

FIG. 4 is a lateral color aberration diagram of the fixed-focus projection lens module of FIG. 2. FIG. 5A to FIG. 5C are diagrams of field curvature and distortion aberrations of the fixed-focus projection lens module of FIG. 2. FIG. 6A to FIG. 6F are respectively transverse ray fan plots of the fixed-focus projection lens module of FIG. 2 at different image heights. In FIG. 4 to FIG. 6F, wavelengths of 460 nm, 525 nm and 615 nm are taken as an example for simulation. In FIG. 5A, a plurality of curves S respectively represent astigmatic field curvatures of light of different wavelengths in the sagittal direction, and in FIG. 5B, a plurality of curves T respectively represent astigmatic field curvatures of light of different wavelengths in a tangential direction. In FIG. 6A to FIG. 6F, horizontal axes (a Py axis and a Px axis) represent positions of a reference ray in the tangential direction and the sagittal direction after passing through a pupil and after normalization. Vertical axes (an ey axis and an ex axis) represent a height difference between the reference ray on an image plane and a field of view chief ray on the image plane. The maximum scale and minimum scale of the ey axis and the ex axis are both ±20 microns, and the maximum scale and minimum scale of the Py axis and the Px axis are both ±1 micron. The graphs shown in FIG. 4 to FIG. 6F are all within the standard range, so that it is verified that the fixed-focus projection lens module 100 of the embodiment may present good imaging quality.

Figure 7:
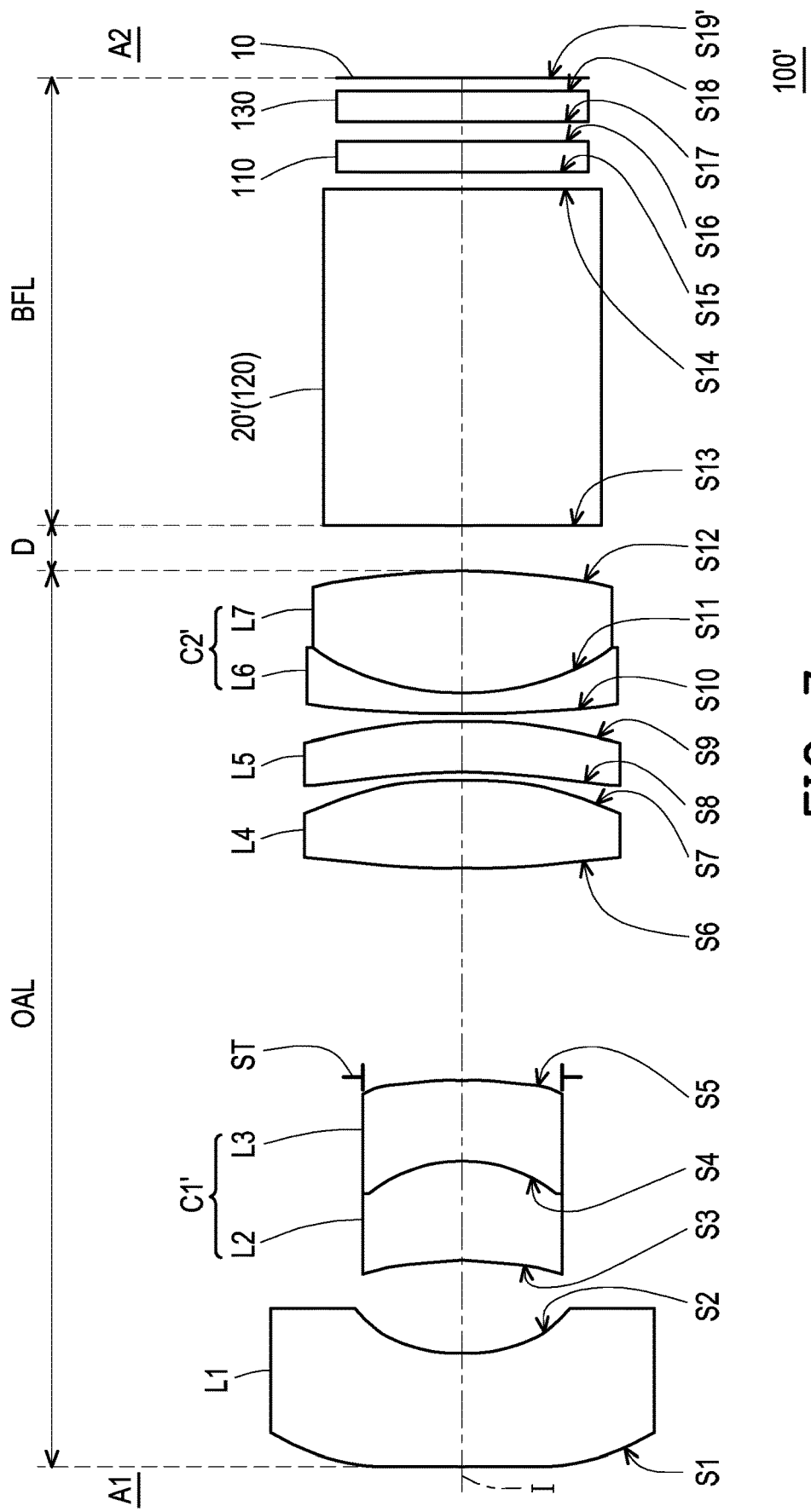
FIG. 7 is a schematic diagram of a fixed-focus projection lens module according to a second embodiment of the disclosure.

FIG. 7 is a schematic diagram of a fixed-focus projection lens module according to a second embodiment of the disclosure. Referring to FIG. 7, a fixed-focus projection lens module 100' of FIG. 7 is substantially similar to the fixed-focus projection lens module 100 of FIG. 2, and main differences there between are as follows. In the embodiment, the fifth lens L5 and the sixth lens L6 respectively have positive and negative refractive powers. In addition, both of the first lens L1 and the fifth lens L5 are plastic aspheric lenses. The second lens L2 and the third lens L3 form a first double cemented lens C1'. The first double cemented lens C1' has a positive refractive power, and the second lens L2 and the third lens L3 are both concave-convex lenses with convex surfaces facing the display side A2. The fifth lens L5 is a concave-convex lens with a convex surface facing the display side A2. The sixth lens L6 and the seventh lens L7 form a second double cemented lens C2'. The second double cemented lens C2' has a positive refractive power, and the sixth lens L6 is a concave-convex lens with a convex surface facing the screen side A1, and the seventh lens L7 is a biconvex lens.

The following table 3 to table 4 list data of a preferred embodiment of the fixed-focus projection lens module 100'. However, the data listed below are not intended to limit the disclosure. Anyone familiar with this field of technology may make appropriate changes to its parameters or settings after referring to the disclosure, but it should still fall within the scope of the disclosure.

In the embodiment, actual designs of the aforementioned elements may be seen in table 3 below.

TABLE 3

| Element | Surface | Type | Curvature (1/mm) | Distance (mm) | Refractive index (Nd) | Abbe number (Vd) |
|---|---|---|---|---|---|---|
| L1 | S1 | Aspheric surface | 600 | 3.70 | 1.53 | 56.0 |
|  | S2 | Aspheric surface | 6.24 | 2.93 |  |  |
| L2 | S3 | Spherical surface | −13.61 | 3.19 | 1.72 | 29.5 |

TABLE 3-continued

| Element | Surface | Type | Curvature (1/mm) | Distance (mm) | Refractive index (Nd) | Abbe number (Vd) |
|---|---|---|---|---|---|---|
| L3 | S4 | Spherical surface | −4.90 | 2.63 | 1.83 | 42.7 |
|  | S5 | Spherical surface | −11.74 | 0.23 |  |  |
| ST |  | Plane | Infinite | 6.56 |  |  |
| L4 | S6 | Spherical surface | 32.92 | 2.82 | 1.50 | 81.5 |
|  | S7 | Spherical surface | −12.10 | 0.20 |  |  |
| L5 | S8 | Aspheric surface | −27.70 | 1.69 | 1.53 | 56.0 |
|  | S9 | Aspheric surface | −14.86 | 0.20 |  |  |
| L6 | S10 | Spherical surface | 34.80 | 0.70 | 1.85 | 23.8 |
| L7 | S11 | Spherical surface | 8.68 | 3.87 | 1.71 | 53.9 |
|  | S12 | Spherical surface | −24.03 | 1.47 |  |  |
| 120 | S13 | Plane | Infinite | 10.8 | 1.74 | 49.3 |
|  | S14 | Plane | Infinite | 0.5 |  |  |
| 110 | S15 | Plane | Infinite | 1.1 | 1.52 | 58.6 |
|  | S16 | Plane | Infinite | 0.5 |  |  |
| 130 | S17 | Plane | Infinite | 1.1 | 1.51 | 62.9 |
|  | S18 | Plane | Infinite | 0.303 |  |  |
| 10 | S19' | Plane | Infinite | 0 |  |  |

In Table 3, the second lens L2 and the third lens L3 are a set of cemented lenses, so that the surface S4 of the second lens L2 facing the display side A2 and the surface S4 of the third lens L3 facing the screen side A1 are the same surface. The sixth lens L6 and the seventh lens L7 are a set of cemented lenses, so that the surface S11 of the sixth lens L6 facing the display side A2 and the surface S11 of the seventh lens L7 facing the screen side A1 are the same surface. The display surface of the light valve 10 is a surface S19'.

Table 4 lists parameter values of the surfaces S1 and S2 of the first lens L1 and the surfaces S8 and S9 of the fifth lens L5, in which the second-order aspheric coefficients A' are all zero.

TABLE 4

|  | S1 | S2 | S8 | S9 |
|---|---|---|---|---|
| K | 0 | 0 | 0 | 0 |
| A | 1.34E−034 | 2.50E−03 | 1.17E−04 | 3.17E−04 |
| B | −3.05E−05 | 2.25E−04 | −9.53E−06 | −1.12E−05 |
| C | 5.69E−07 | −4.98E−05 | 1.36E−06 | 1.77E−06 |
| D | −5.07E−10 | 6.58E−06 | −9.86E−08 | −1.39E−07 |
| E | −1.94E−10 | −4.11E−07 | 4.01E−09 | 6.09E−09 |
| F | 3.51E−12 | 1.26E−08 | −8.72E−11 | −1.41E−10 |
| G | −1.99E−14 | −9.66E−11 | 7.84E−13 | 1.33E−12 |

In addition, in the embodiment, a light-transmitting element 20' of the fixed-focus projection lens module 100' is the prism 120. Moreover, as shown in FIG. 7, the flat glass actuator 110 and the cover glass 130 are located between the seventh lens L7 and the light valve 10 on the optical axis I, and located between the light-transmitting element 20' and the light valve 10.

Figure 8:
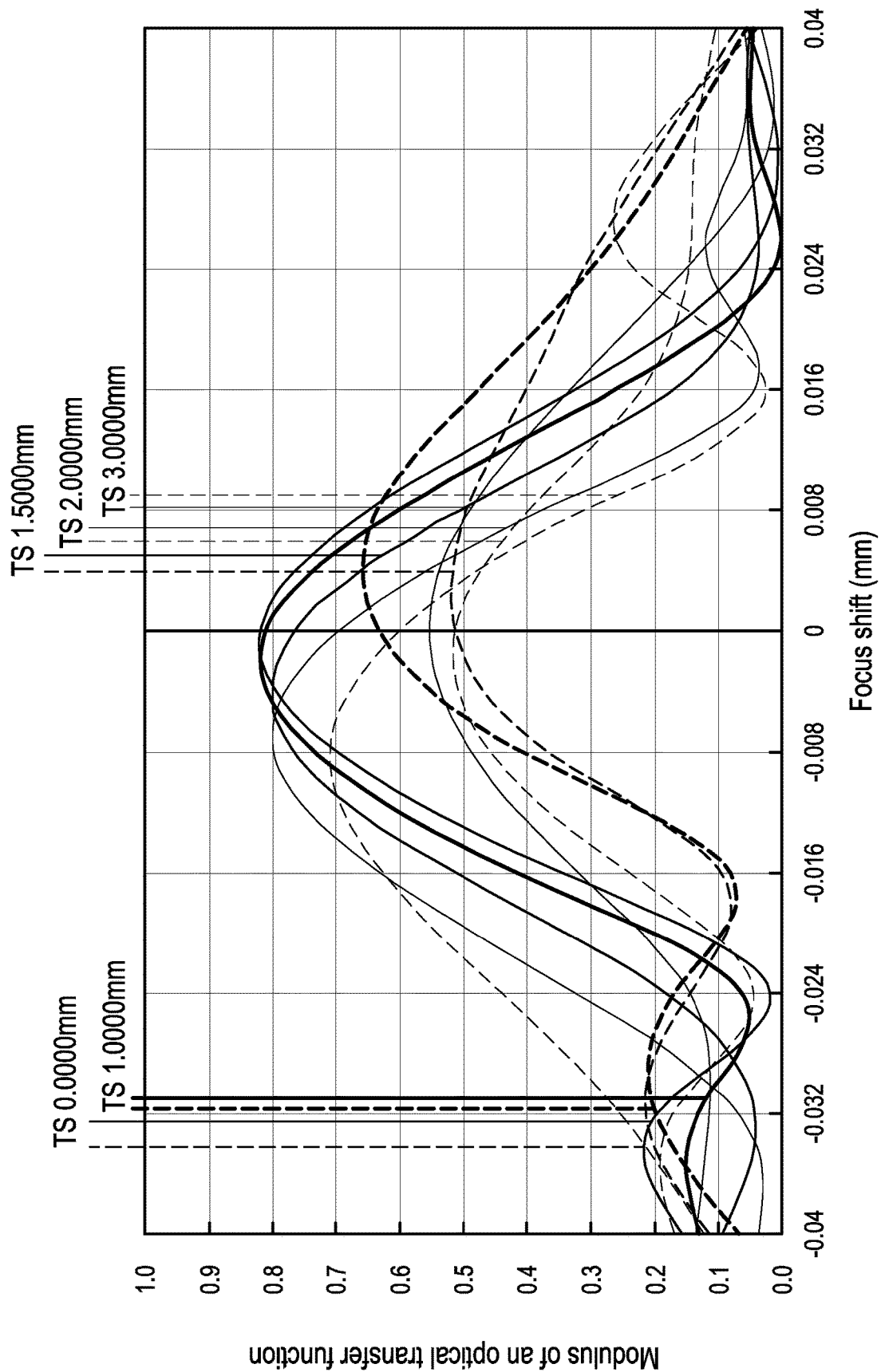
FIG. 8 is a modulation transfer function (MTF) diagram of the fixed-focus projection lens module of FIG. 7.

FIG. 8 is a modulation transfer function diagram of the fixed-focus projection lens module of FIG. 7. Referring to FIG. 8. It is verified from FIG. 8 that the optical transfer function curve shown by the fixed-focus projection lens module 100' of the embodiment is within the standard range, so that it has good optical imaging quality.

In summary, in an embodiment of the disclosure, the fixed-focus projection lens module is designed as a single-group structure including the first lens to the seventh lens, and satisfies 1<|OAL/BFL|<2.1. Compared with the conventional fixed-focus lens with a normal projection ratio, the fixed-focus projection lens module of the embodiment of the disclosure is simple in structure and easy to assemble. Compared with a zoom lens, the fixed-focus projection lens module of the embodiment of the disclosure has a shorter production time and lower complexity, and when performing focusing, since the lens group of the disclosure has a single-group structure and a distance between the lenses is unchanged, and has a fixed effective focal distance, and there is no need to reserve extra space between the lenses to change the distance, the fixed-focus projection lens module of the embodiment of the disclosure may meet the characteristics of 1<|OAL/BFL|<2.1, and may meet the requirements of thinness, shortness, and smallness while meeting the requirement of high resolution (93 lp/mm).

In addition, the fixed-focus projection lens module of the embodiment of the disclosure may also achieve the following effects and advantages:

1. The fixed-focus projection lens module of the embodiment of the present disclosure has an aperture of less than or equal to 1.6, and has a higher light energy usage efficiency under a same light source intensity.

2. At least one of the lenses far away from the light source of the projection device is designed as a plastic lens, such as the first lens or the fifth lens, by which not only a weight of the fixed-focus projection lens module of the embodiment of the disclosure is reduced, a withstand temperature of the fixed-focus projection lens module is also increased.

3. As the distance D between the lens and the light-transmitting element is designed to be variable, the focusing structure of the fixed-focus projection lens module is simple, and the cost of the fixed-focus projection lens module of the embodiment of the disclosure is lower.

4. The first lens and the seventh lens or the fifth lens are designed as aspheric lenses, which may effectively reduce image aberration and improve imaging resolution.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A fixed-focus projection lens module, for projecting an image beam provided by a light valve onto a screen, wherein the fixed-focus projection lens module comprises a lens group and a light-transmitting element, wherein the lens group consists of seven lenses having refractive powers, and the seven lenses are a first lens, a second lens, a third lens, a fourth lens, a fifth lens, a sixth lens and a seventh lens, wherein the first lens, the second lens, the third lens, the fourth lens, the fifth lens, the sixth lens, the seventh lens and the light-transmitting element are arranged in sequence from a screen side to a display side along an optical axis, wherein each of the first lens, the second lens, the third lens, the fourth lens, the fifth lens, the sixth lens, the seventh lens and the light-transmitting element has a screen side surface facing the screen side and allowing the image beam to pass through, and a display side surface facing the display side and allowing the image beam to pass through, wherein:

the first lens, the second lens, the third lens, the fourth lens, and the seventh lens respectively have negative, positive, negative, positive, and positive refractive powers; and the fixed-focus projection lens module satisfies:

$1<|OAL/BFL|<2.1$, wherein OAL is a distance from the screen side surface of the first lens to the display side surface of the seventh lens on the optical axis, BFL is a distance from the screen side surface of the light-transmitting element to a display surface of the light valve on the optical axis, and the light-transmitting element is a first optical element with no refractive power located behind the seventh lens along the optical axis from the screen side to the display side.

2. The fixed-focus projection lens module as claimed in claim 1, wherein the light-transmitting element is a flat glass actuator or a prism.

3. The fixed-focus projection lens module as claimed in claim 1, wherein the fifth lens and sixth lens respectively have negative and positive refractive powers.

4. The fixed-focus projection lens module as claimed in claim 1, wherein the fifth lens and sixth lens form a first double cemented lens, the first double cemented lens has a positive refractive power, wherein the fifth lens is a biconcave lens, and the sixth lens is a biconvex lens.

5. The fixed-focus projection lens module as claimed in claim 1, wherein the first lens is a concave-convex lens with a convex surface facing the screen side, the third lens is a biconcave lens, and the fourth lens is a biconvex lens.

6. The fixed-focus projection lens module as claimed in claim 1, wherein the first lens is a plastic aspheric lens.

7. The fixed-focus projection lens module as claimed in claim 1, wherein the seventh lens is a glass aspheric lens.

8. The fixed-focus projection lens module as claimed in claim 1, wherein the fifth lens and the sixth lens respectively have positive and negative refractive powers.

9. The fixed-focus projection lens module as claimed in claim 1, wherein the second lens and the third lens form a first double cemented lens, the first double cemented lens has a positive refractive power, wherein the second lens and the third lens are both concave-convex lenses with convex surfaces facing the display side.

10. The fixed-focus projection lens module as claimed in claim 1, wherein the sixth lens and seventh lens form a second double cemented lens, the second double cemented lens has a positive refractive power, wherein the sixth lens is a concave-convex lens with a convex surface facing the screen side, and the seventh lens is a biconvex lens.

11. The fixed-focus projection lens module as claimed in claim 1, wherein the first lens and fifth lens are plastic aspheric lenses.

12. The fixed-focus projection lens module as claimed in claim 1, wherein when the fixed-focus projection lens module performs focusing, the fixed-focus projection lens module is adapted to change a distance D, wherein the distance D is a distance from the display side surface of the seventh lens to the screen side surface of the light-transmitting element on the optical axis.

13. The fixed-focus projection lens module as claimed in claim 1, wherein a F-number of the fixed-focus projection lens module is less than or equal to 1.6.

14. The fixed-focus projection lens module as claimed in claim 1, further comprising:

a stop, located between the third lens and the fourth lens on the optical axis.

15. The fixed-focus projection lens module as claimed in claim 1, wherein the fixed-focus projection lens module is a telecentric projection lens module.

16. The fixed-focus projection lens module as claimed in claim 1, further comprising:

a prism, located between the seventh lens and the light valve on the optical axis.

17. The fixed-focus projection lens module as claimed in claim 1, further comprising:

a cover glass, located between the seventh lens and the light valve on the optical axis.

* * * * *